United States Patent
McCarroll et al.

(10) Patent No.: US 10,502,303 B2
(45) Date of Patent: Dec. 10, 2019

(54) CAM FOLLOWER AND GUIDE ASSEMBLY

(71) Applicant: GM Global Technology Operations LLC, Detroit, MI (US)

(72) Inventors: Michael E. McCarroll, Kentwood, MI (US); Anteo C. Opipari, Saugatuck, MI (US); Nick Hendriksma, Grand Rapids, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 15/966,414

(22) Filed: Apr. 30, 2018

(65) Prior Publication Data

US 2019/0331207 A1    Oct. 31, 2019

(51) Int. Cl.
*F16H 53/06* (2006.01)
*F02M 59/10* (2006.01)
*F01L 1/14* (2006.01)

(52) U.S. Cl.
CPC ............... *F16H 53/06* (2013.01); *F01L 1/14* (2013.01); *F02M 59/102* (2013.01)

(58) Field of Classification Search
CPC ......... F01L 2105/02; F01L 1/14; F01L 1/143; F16H 53/06; F02M 59/102; F04B 1/0426; F04B 1/0408; F16C 13/006; Y10T 74/2107
See application file for complete search history.

(56) References Cited

U.S. PATENT DOCUMENTS

| | | | |
|---|---|---|---|
| 5,273,005 A * | 12/1993 | Philo | F01L 1/14 123/90.5 |
| 5,307,769 A | 5/1994 | Meagher et al. | |
| 5,676,098 A | 10/1997 | Cecur | |
| 7,311,087 B2 * | 12/2007 | Shaull | F02M 59/102 123/495 |
| 8,863,615 B2 | 10/2014 | Yabuuchi et al. | |
| 9,422,834 B2 | 8/2016 | Fujii et al. | |
| 9,644,729 B2 * | 5/2017 | Berruet | F02M 59/102 |
| 9,803,515 B2 | 10/2017 | Oka | |
| 2006/0005797 A1 | 1/2006 | Schubeck | |

FOREIGN PATENT DOCUMENTS

DE    202018105429 U1 * 10/2018 ........... F02M 59/102

* cited by examiner

*Primary Examiner* — Patrick Cicchino

(57) ABSTRACT

A cam follower assembly having a plastic guide body and a cam follower having two opposing roller shaft ends is provided. The single piece guide body includes a pair of grooved members. Each of the grooved members include an interior surface defining an elongated guide groove having a recessed surface. The elongated guide grooves are facing and aligned with each other. The cam follower is disposed between the pair of grooved member such that one of the roller shaft ends is received in one guide groove and the opposite roller shaft end is received in the other of the guide groove. The roller shaft ends are slidable in a reciprocal axial direction within the elongated guide grooves and retained between the recessed surfaces. The plastic guide body may be injection molded from a nylon material having glass fibers.

18 Claims, 5 Drawing Sheets

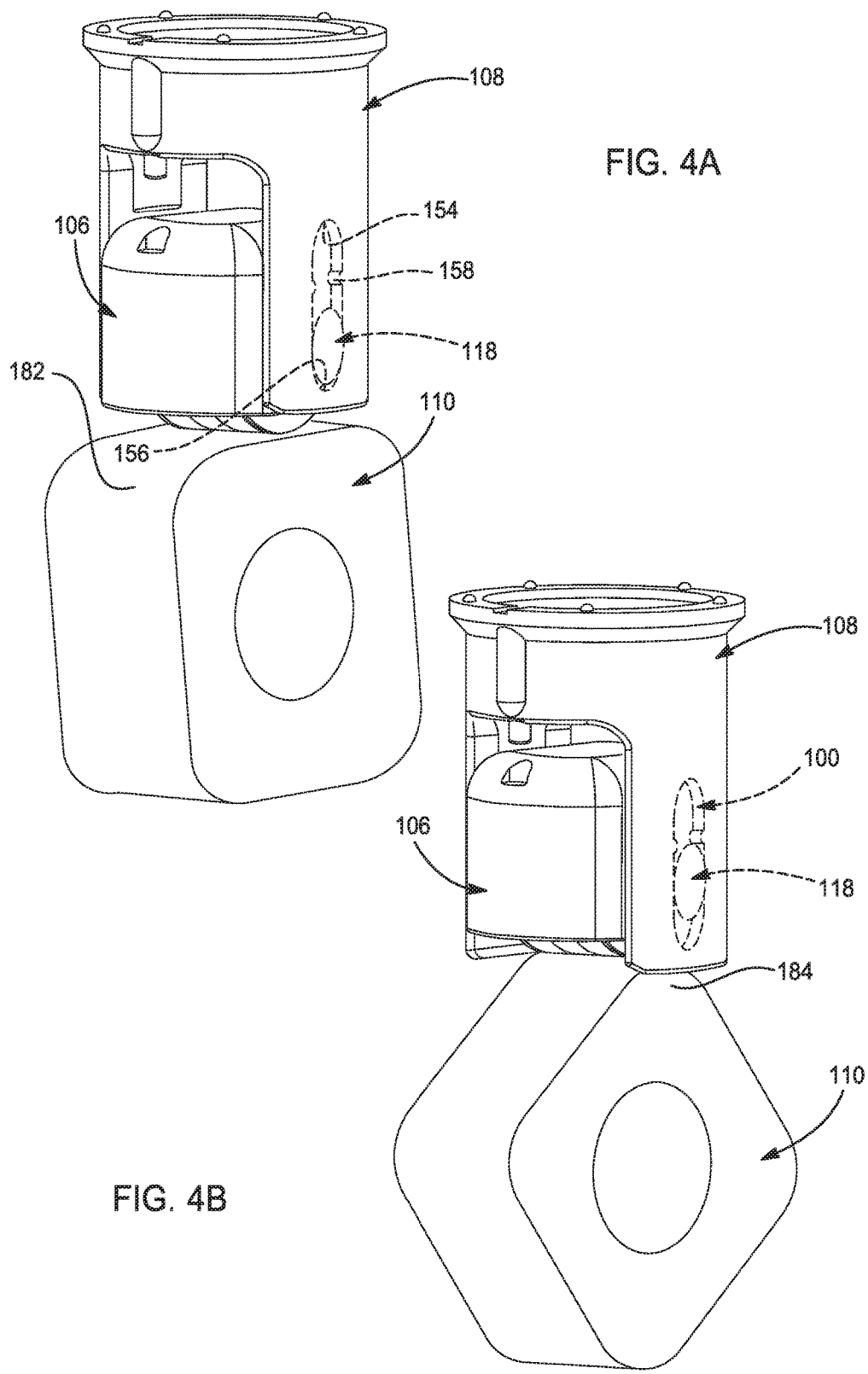

CAM FOLLOWER AND GUIDE ASSEMBLY

INTRODUCTION

The present disclosure relates to a lifter assembly, more particularly to a lifter assembly for activating a fuel pump.

Modern interior combustion engines utilize fuel pump assemblies capable of delivering high pressure fuel, such as gasoline, diesel, and Ethanol 85 (E85), directly into the combustion chambers of the engines. A fuel pump assembly typically includes a mechanical pump actuated by a tappet, also known as a cam follower, riding on a cam lobe. The cam lobe is mounted on a cam shaft which it driven by and rotates synchronously with the crankshaft of the engine. The profile and rate of rotation of the cam lobe determines the amount and frequency of fuel delivered to the engine.

The cam follower translates the rotational motion of the cam lobe into axial reciprocal motion. The cam follower is abutted against a first end of a plunger shaft. The second end, opposite the first end, of the plunger shaft is connected to a plunger, which is configured to deliver a predetermined amount of high pressure fuel at each axially reciprocation of the plunger. The plunger shaft is biased toward the cam follower by a spring to urge the first end of the plunger in continuous contact with the cam follower and the cam follower in continuous contact with the cam lobe. Each rotation of the cam lobe causes an axially reciprocation of the plunger thus delivering fuel to the engine with each stroke of the plunger.

The cam follower is disposed within a bore defined within the fuel pump assembly mount. The cam follower typically includes a housing supporting a roller configured to ride on a surface of the cam lobe and guidance peg extending from a side of the housing. The peg is received within a corresponding channel in the wall of the bore. The peg cooperates with the channel to prevent the cam follower from rotating within the bore. The housing of the cam follower, including the extending peg, is typically formed of steel and the mount for the fuel pump assembly is typically formed of a casted iron alloy or casted aluminum alloy. During normal operating conditions, undesirable engine noise, vibration, and harshness may be caused by the reciprocating mass of the cam follower, the direct metal-to-metal between the cam housing and wall of the bore, and the lashing of the peg riding within the channel.

Thus, while current cam followers achieve their intended purpose, there is a need for a new and improved cam follower that has less reciprocating mass, quieter operation, and lower cost of manufacture.

SUMMARY

According to several aspects, a cam follower assembly is disclosed. The cam follower assembly includes a guide body having a pair of grooved members. Each of the grooved members include an interior surface defining an elongated guide groove having a recessed surface. The elongated guide groove of one of the grooved member is facing and aligned with the elongated guide groove of the other grooved member. The cam follower assembly also includes a cam follower having a roller with two opposing roller shaft ends disposed between the pair of grooved member. One of the roller shaft ends is received in one guide groove and the other of the roller shaft ends is received in the other of the guide groove such that the roller shaft ends are slidable in a reciprocal axial direction within the elongated guide grooves and retained between the recessed surfaces.

In an additional aspect of the present disclosure, at least one of the elongated guide grooves includes a first stop limit, a second stop limit opposite the first stop limit, and a restrictive projection extending into the elongated guide groove between the first and second stop limits.

In another aspect of the present disclosure, the restrictive projection is sufficiently spaced from the first stop limit to define a retention portion of the elongated guide groove.

In another aspect of the present disclosure, the restrictive projection is sufficiently spaced from the second stop limit to define an operating portion of the elongated guide groove.

In another aspect of the present disclosure, at least one of the first stop limit and second stop limit includes a shape that is complementary to the shape of the roller shaft end.

In another aspect of the present disclosure, the guide body includes a hollow cylindrical portion, and the pair of grooved members extends from an end of the cylindrical portion.

In another aspect of the present disclosure, the hollow cylindrical portion includes an edge surface extending between the pair of grooved members, and the edge surface includes a stud.

In another aspect of the present disclosure, the hollow cylinder includes an end having an annular flange defining a radially extending notch and an exterior cylindrical surface defining an axially extending rib aligned with the notch.

In another aspect of the present disclosure, the cam follower includes a follower housing having two opposite facing parallel sides. The opposite facing parallel sides are slidable against the respective interior surfaces of the grooved members when the end shafts of the roller are received within the respective elongated guide grooves.

In another aspect of the present disclosure, the guide body is formed of a plastic material having a reinforcement fiber and the cam follower is formed of a metallic material.

According to several aspects, a cam follower assembly having a plastic guide body and cam follower is disclosed. The plastic guide body includes an annular flange, a chamfered shoulder transitioning from the annular flange to a hollow cylindrical portion, and a pair of grooved members extending from the hollow cylindrical portion. Each of the grooved members includes an interior planar surface defining a guide groove having a recessed surface, wherein one of the guide groove is facing and aligned with the other of the guide grooves. The cam follower is disposed between the pair of grooved members. The cam follower includes a follower housing having two opposite facing planar sides and an open face, wherein each of the planar sides defines a roller shaft opening. A roller is partially disposed within the follower housing through the open face, wherein the roller includes a roller shaft having two opposite ends extending out of the follower housing through the shaft openings and received in the respective guide grooves between the recessed surfaces.

In an additional aspect of the present disclosure, each of the grooved members includes an exterior surface having the same curvature as that of the hollow cylindrical portion.

In another aspect of the present disclosure, the annular flange defines a radially extending notch and a plurality of spaced protrusions. The hollow cylindrical portion includes an exterior cylindrical surface defining an axially extending rib aligned with the radially extending notch.

In another aspect of the present disclosure, the hollow cylindrical portion includes a stud extending from an edge surface between the pair of grooved members.

In another aspect of the present disclosure, at least one of the elongated grooves include a retention portion and an operating portion separated by a restrictive projection.

In another aspect of the present disclosure, the roller shaft end received in the elongated groove may be urged from the retention portion to the operating portion or from the operating portion to the receiving portion by a predetermined axial force applied against the cam follower.

According to several aspects, a cam follower assembly having a plastic guide body and a metallic cam follower is disclosed. The plastic guide body includes a pair of grooved members extending from the hollow cylindrical portion. Each of the grooved members includes an interior planar surface defining a guide groove. The metallic cam follower includes two opposing planar surfaces slidably inserted between the interior planar surfaces and two opposing roller shafts extending through the planar surfaces and slidably received in the respective guide grooves of the plastic guide body.

In an additional aspect of the present disclosure, the plastic guide body further includes an edge surface interconnecting the grooved members, wherein the edge surface includes an extended stud. The metallic cam follower includes an aperture to receive the stud such that the metallic cam follower is constrained onto the plastic guide body.

In another aspect of the present disclosure, the guide grooves includes a first stop limit, a second stop limit opposite the first stop limit, and a restrictive projection extending into the elongated guide groove between the first and second stop limits.

In another aspect of the present disclosure, the plastic guide body is formed of a nylon material and a glass fiber reinforcement.

Benefits of the follower assembly includes reduced noise, vibration, and harshness due to the lower reciprocating mass and reduced metal-to-meal contact. Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4A is a perspective view of the cam follower and guide assembly showing the cam follower in a first operating state, according to an exemplary embodiment;

FIG. 4B is a perspective view of the cam follower and guide assembly showing the cam follower in a second operating state, according to an exemplary embodiment;

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not to be interpreted as limiting, but as a representative basis for teaching one skilled in the art as to how to practice the disclosed concepts.

Figure 1:
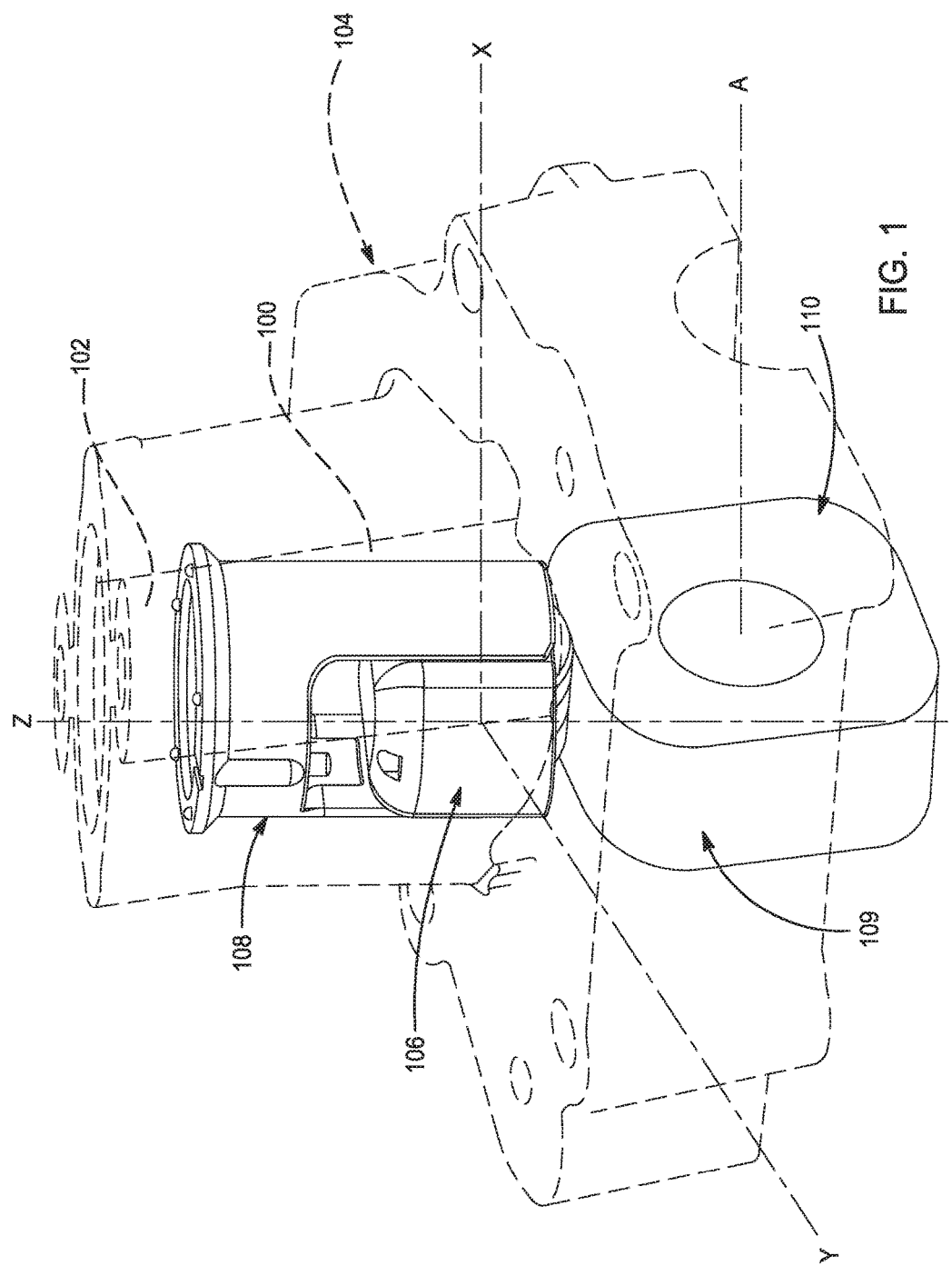
FIG. 1 is a perspective view of a cam follower and guide assembly disposed within a bore of a mount for a pump assembly, according to an exemplary embodiment.

FIG. 1 shows a cam follower and guide assembly, generally indicated by reference number 100, disposed within a bore 102 of a fuel pump assembly mount 104. The cam follower and guide assembly, herein referred to as the follower assembly 100, includes a metallic cam follower 106 slidably retained within a single piece plastic guide body 108. When the fuel pump assembly mount 104 is assembled onto an interior combustion engine (not shown), the cam follower 106 rides on a periphery surface 109 of a cam lobe 110. When the engine is in operating mode, the cam lobe 110 rotates about an A-axis. The cam follower 106, guided by the guide body 108 and bore 102, translates the rotational movement of the cam lobe 110 into a reciprocating axial movement along a Z-axis. The reciprocating axial movement is transmitted to a plunger of the fuel pump assembly to deliver fuel to the engine. The guide body 108 is a single integral plastic structure that may be formed by injection molding of a nylon material containing approximately 32 weight percent of a glass fiber reinforcement. The cam follower 106 may be stamped or fabricated from a metallic material such as a steel sheet.

Figure 2:
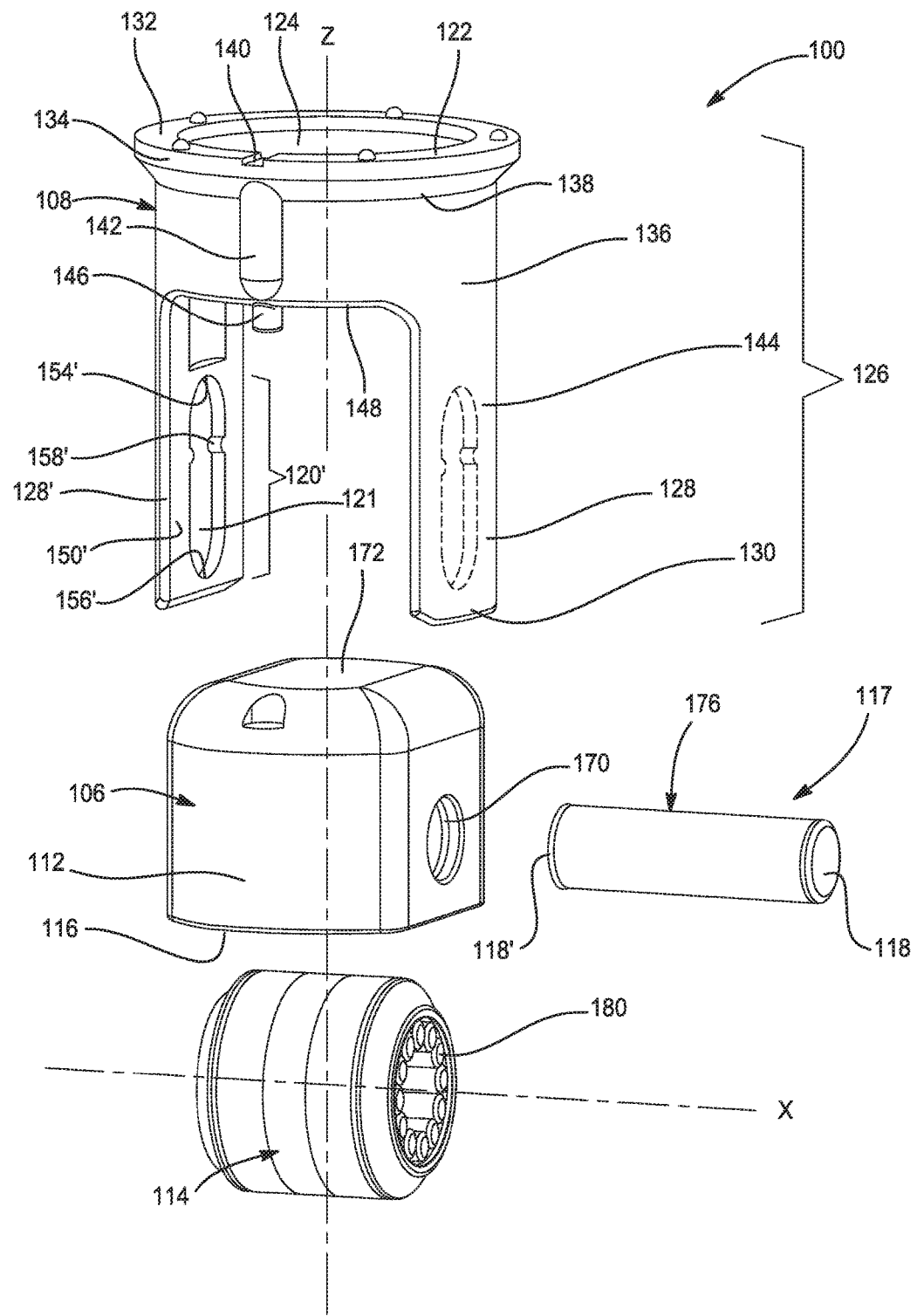
FIG. 2 is a perspective exploded view of the cam follower and guide assembly of FIG. 1, according to an exemplary embodiment.

FIG. 2 shows an exploded view of the follower assembly 100 extending along the Z-axis. The follower assembly 100 includes the plastic guide body 108 and the metallic cam follower 106. The cam follower 106 includes a follower housing 112 having a roller 114, a portion of which extends through an open face 116 of the follower housing 112. The roller 114 rotates about an X-axis, which is parallel to the rotational A-axis of the cam lobe 110. The roller 114 is connected to the follower housing 112 by a roller shaft 117 having opposing roller shaft ends 118, 118' extending through the follower housing 112. The roller shaft ends 118, 118' are received in corresponding guide grooves 120, 120' defined in the guide body 108 such that the roller shaft ends 118, 118' are slidable within the respective guide grooves 120, 120' and retained between recessed surfaces 121, 121'.

The guide body 108 includes an annular flange 122 adjacent a first end 124 of the guide body 108, a hollow cylindrical portion 126 extending from the annular flange 122, and a pair of grooved members 128, 128' extending from the cylindrical portion toward a second end 130 opposite the first end 124. The annular flange 122 includes an annular surface 132 perpendicular to the Z-axis and a flange side surface 134 extending from the annular surface 132 parallel to the Z-axis. The flange side surface 134 tapers to an exterior cylindrical surface 136 of the cylindrical portion 126 thus defining a chamfered shoulder 138 transitioning from the flange side surface 134 to the exterior cylindrical surface 136. The curvatures of the flange side surface 134 and the exterior cylindrical surface 136 are complementary to the curvature of the interior surfaces of the bore 102 such that the guide body 108 seats against the interior surface of the bore 102 when the guide body 108 is inserted and positioned within the bore 102. The chamfered shoulder 138 cooperates with a corresponding ledge defined in the bore 102 to limit the depth that the guide body 108 is insertable into the bore 102.

The annular surface 132 defines a notch 140 extending radially from the Z-axis. The exterior cylindrical surface 136 defines an elongated rib 142 extending perpendicular from the notch 140 and parallel to the Z-axis toward the second end 130 of the guide body 108. The elongated rib 142 is configured to be receivable in a corresponding rib receptacle defined along a length of the bore 102 of the mount 104. The rib receptacle does not necessary have to extend through the full length of the bore, but only to the extent necessary to receive the elongated rib 142. In this configuration, the cam follower 106 does not come into contact with the rib receptacle during the normal operations of the follower assembly 100. The elongated rib 142 cooperates with the rib receptacle to properly locate the follower assembly 100 within the bore 102 at a predetermined position and prevents the follower assembly 100 from rotating about the Z-axis within the bore 102, thus ensuring that the X-axis of rotation of the roller remains parallel with the A-axis of rotation of the cam lobe 110. The notch 140 is used as a visual indicator to properly align the follower assembly 100 with the pump assembly mount 104 prior to and during insertion of the follower assembly 100 into the bore 102 of the pump assembly mount 104. Best shown in FIG. 5B, the annular surface also includes a plurality of equally spaced deformable protrusions 145.

Integrally extending in parallel from the cylindrical portion 126 toward the second end 130 of the guide body 108 is a pair of grooved members 128, 128'. Each of the grooved members 128, 128' includes an exterior surface 144, 144' having a curvature that is complementary to the curvature of the bore 102 such that the exterior surfaces 144, 144' of the grooved members 128, 128' seat adjacent the corresponding surfaces of the bore 102 once the guide body 108 is positioned within the bore 102. A stud 146 extends axially from an edge surface 148 of the cylindrical portion 126 between the pair of grooved members 128, 128'. The stud 146 is configured to be insertable into corresponding feature in the cam follower 106 to maintain the cam follower in a desired orientation prior to assembly by preventing the rotation of the cam housing about the X axis. The cylindrical portion 126 may also include a secondary stud 146' located 180 degree from the stud 146 relative to the Z-axis.

The first grooved member 128 includes an interior first planar surface 150 defining a first elongated guide groove 120 extending axially in parallel with the Z-axis. The first elongated guide groove 120 includes a first stop limit 154 proximal to the cylindrical portion 126 and a second stop limit 156, opposite of the first stop limit 154, proximal to the second end of the guide body 108. Each of the first and second stop limits 154, 156 includes a semi-circular profile configured to cradle the ends of the roller shaft 117. The first planar surface 150 also defines a restrictive projection 158 extending into the first elongated guide groove, thus dividing the elongated guide groove 120 into a retention portion 160 and operating portion 162. The second grooved member 128' includes a second planar surface 150' in parallel with and facing toward the first planar surface 150 of the first grooved member 128. Similar to the first planar surface 150, the second planar surface 150' defines a second elongated guide groove 120' having a first stop limit 154', a second stop limit 156', and a restrictive projection 158' dividing the guide groove 120' into a retention portion 160' and an operating portion 162'. The shape, size, and locations of the first stop limit 154', second stop limit 156', and restrictive projection 158' of the second grooved member 128' are substantially mirror images of the first stop limit 154, second stop limit 156, and restrictive projection 158 of the first grooved member 128, respectively.

Figure 3:
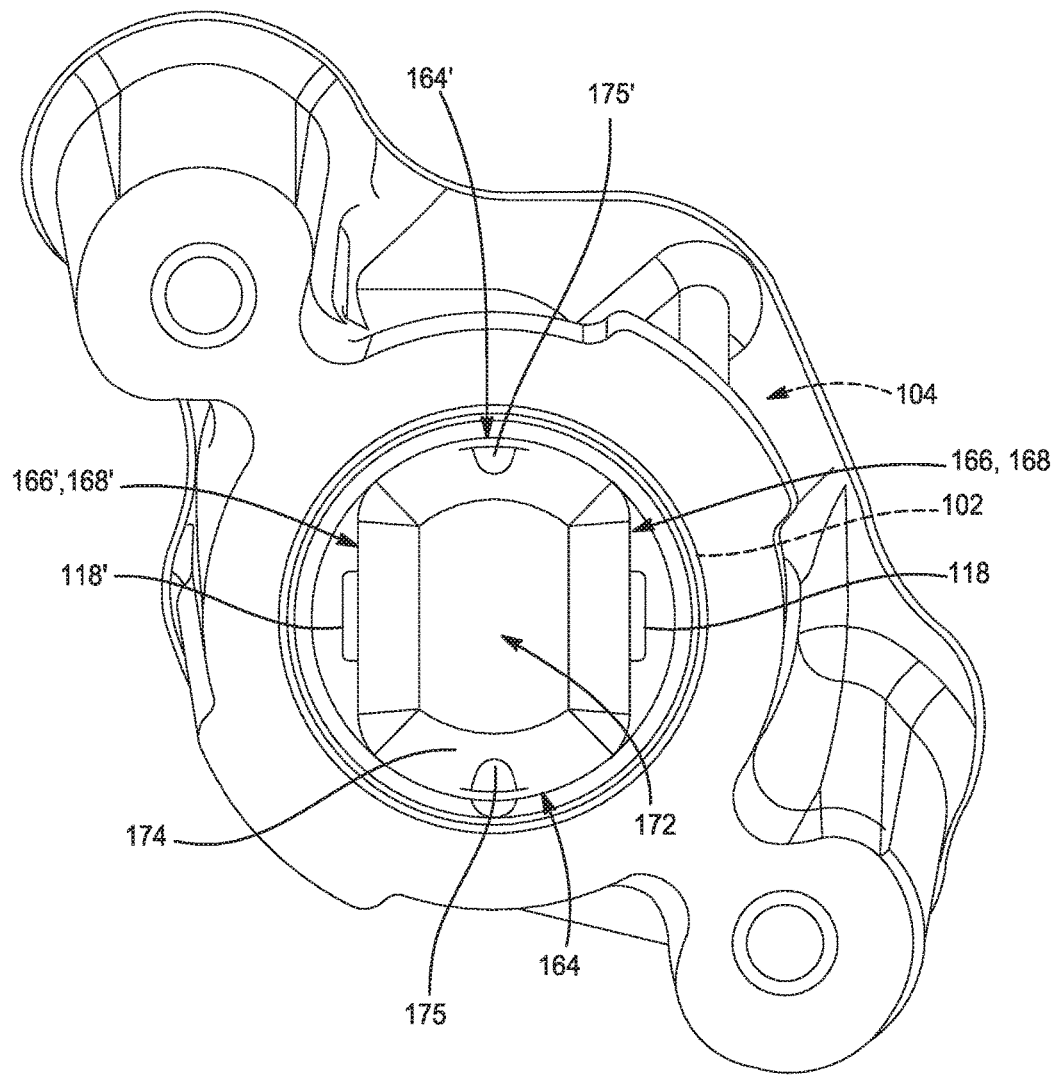
FIG. 3 is a top view of the mount for the pump assembly showing the cam follower, without the guide, disposed within the bore, according to an exemplary embodiment.
Figure 5A:
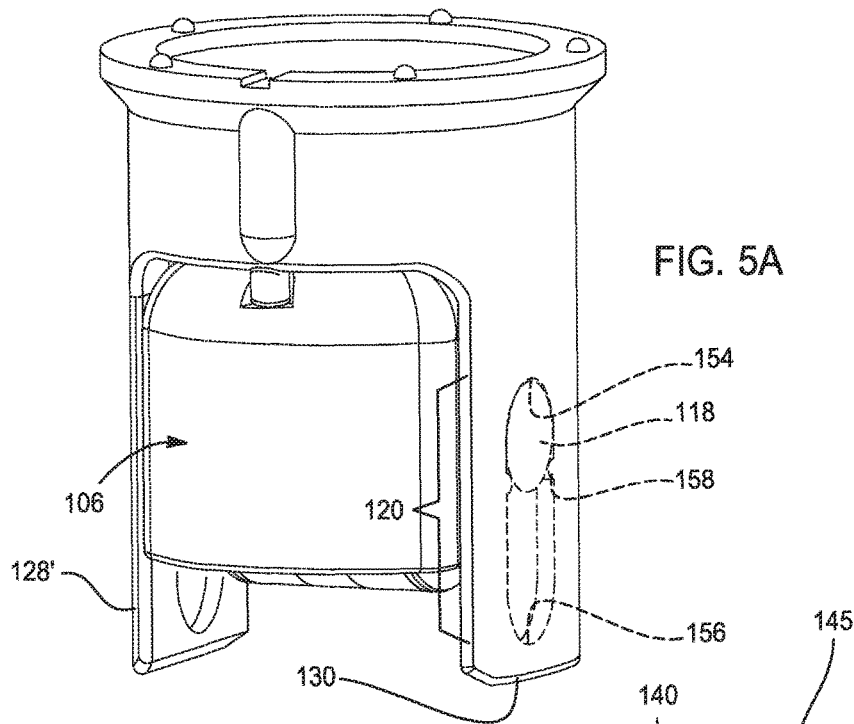
FIG. 5A is a perspective view of the cam follower and guide assembly showing the cam follower in a shipping orientation, according to an exemplary embodiment.
Figure 5B:
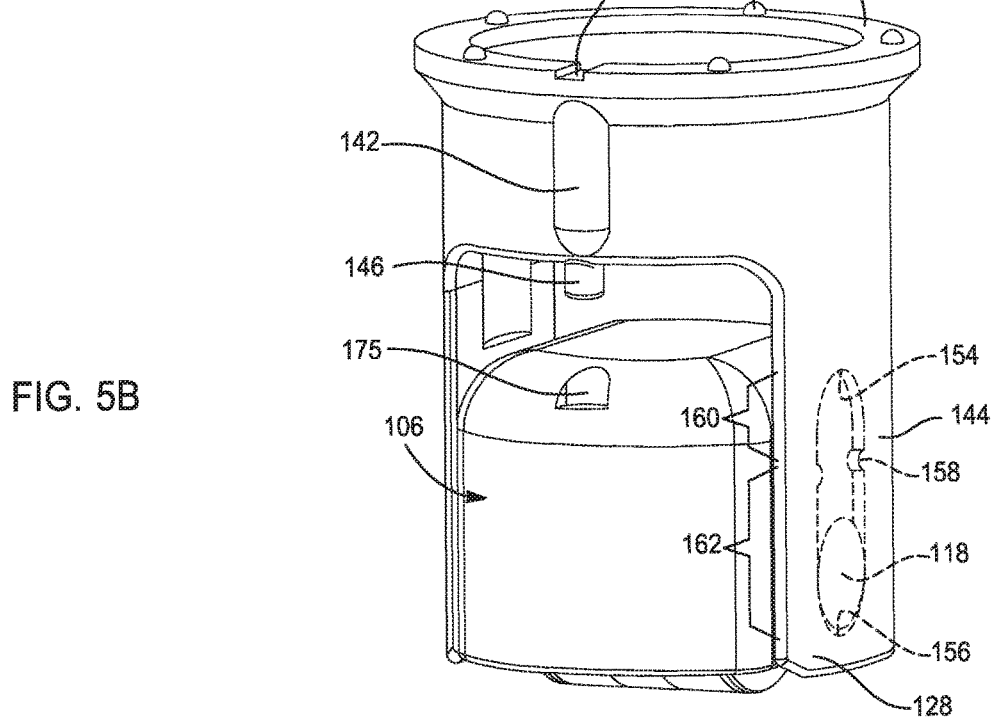
FIG. 5B is a perspective view of the cam follower and guide assembly showing the cam follower in a service orientation, according to an exemplary embodiment.

Referring to FIG. 2, FIG. 3, and FIG. 5B the follower housing 112 includes a pair of opposite facing curved surfaces 164, 164'. The curved surfaces 164, 164' curves about the Z-axis and are interconnected by a pair of parallel walls 166, 166'. Each of the parallel walls 166, 166' include an exterior planar surface 168, 168'. Each of the parallel walls 166, 166' defines an opening 170, 170' configured to receive and retain one of the roller shaft ends 118, 118'. The distance between the opposite facing exterior planar surfaces 168, 168' is slightly greater than the distance between the interior planar surfaces 150, 150' of the grooved members 128, 128' when the guide member is in a relaxed state. Once the follower housing 112 is inserted between the grooved members 128, 128', the grooved members 128, 128' are urged outward such that the planar surfaces 168, 168' of the follower housing 112 are in firm slidable contact with the planar surfaces 150, 150' of the grooved members 128, 128'.

The follower housing 112 also includes a top planar contact surface 172 perpendicular to the Z-axis for engaging an end of the plunger of the fuel pump assembly. The contact surface 172 transitions to at least one of the curve surfaces 164, 164' via a rounded edge surface 174. Defined in the rounded edge surface 174 is an aperture 175 aligned with the extended stud 146 when the cam follower 106 is inserted between the grooved members 128, 128'. The studs 146, 146' may be inserted into the corresponding apertures 175, 175' to prevent the cam follower from rotating about the X-axis prior to installation. At least one of the studs 146, 146' may be sized to provide an interference fit with the corresponding aperture 175, 175'.

Best shown in FIG. 3, for clarity of illustration and description, the cam follower 106 is shown disposed within the bore 102 without the guide body 108. The curved surfaces 164, 164' of the follower housing 112 are complementary to and in slidable contact with the corresponding interior surface of the bore 102. The opposite planar surfaces 168, 168' of the follower housing 112 are spaced from the interior surface of the bore 102 and are in slidable contact with the interior planar surfaces 150, 150' of the grooved members 128, 128'. The opposite planar surfaces 168, 168' of the follower housing 112 cooperates with the interior surfaces 150, 150' of the grooved members 128, 128' to prevent the cam follower 106 from rotating about the Z-axis and about the Y-axis. The minimal contact between the cam follower 106 and surface of the bore 102 reduces operating noise caused by backlash and metal-to-metal contact. The metal-to-plastic contact with the guide body 108 dampens the vibrations caused by the reciprocal movement and clashing due to the reduction of the amount of metal-to-metal contact. Furthermore, the reduced overall size of the cam follower 106 allows for less reciprocating mass. By not having the rib receptacle or channel running the full length of the bore, the curved surfaces 164, 164' of the follower housing 112 would not need to slide against edges defining the rib receptacle or channel, therefore less wear of the curved surfaces 164, 164' is expected.

Referring back to FIG. 2, the roller shaft 117 includes an exterior surface 176 onto which the roller 114 is rotatably mounted via a plurality of roller bearings 180. The roller 114 includes a length that is less than the distance between the interior surfaces of the pair of parallel walls 166, 166'. The roller 114 is configured to engage the rotating cam lobe 110 when the follower assembly 100 is mounted onto the engine. The distance between the opposing roller shaft ends 118, 118' is greater than the distance between the exterior surfaces 168, 168' of the parallel walls 166, 166' such that the end of the roller shaft ends 118, 118' extends through the shaft openings 170, 170' and slidably supported within the guide grooves 120, 120' when the cam follower 106 is assembled onto the guide body 108. The roller shaft ends 118, 118' may be free-floating relative to the follower housing 112 or swaged to the follower housing 112.

Referring to FIG. 4A, the cam follower 106 is shown riding on a base portion 182 of the cam which positions the roller shaft ends 118, 118' proximal to the second stop limits 156, 156' of the guide groove 120, 120' without contacting the second stop limits 156, 156'. Referring to FIG. 4B, the cam follower 106 is shown riding on an apex portion 184 of the cam which positions the roller shaft ends 118, 118' of the roller shaft 117 proximal to the restrictive projections 158, 158' of the guide grooves 120, 120' without contacting the restrictive projections 158, 158'. Thus in normal operating conditions, the cam follower 106 is guided in a reciprocal axial motion by the operating portions 162, 162' of the guide groove 120, 120' where the limit of travel of the roller shaft ends 118, 118' does not extend into contact with the second stop limits 156, 156' or the restrictive projection 158, 158'.

Referring to FIG. 5A, the cam follower 106 is shown in a shipping position. For shipping purposes, the roller shafts ends 118, 118' of the cam follower 106 may be urged through the restrictive projections 158, 158' from the operating portions 162, 162' into the retention portions 160, 160' of the guide grooves 120, 120' by a predetermined axial force applied to the cam follower 106 in a direction toward the first end 124 of the guide body 108. The distance between the first stop limits 154 and restrictive projection 158 is approximately the diameter of the roller shaft end 118 such that the roller shaft end 118 is retained in a fixed position between the first stop limit 154 and restrictive projection 158. During assembly, the shafts ends 118, 118' of the cam follower 106 may be urged through the restrictive projections 158, 158' into the operating portions 162, 162' of the guide grooves 120, 120' by a predetermined axial force applied to the cam follower 106 in a direction toward the second end 130. Referring to FIG. 5B, the cam follower 106 is shown in a service position. When the follower assembly 100 is removed from the mount 104 of the pump assembly, the cam follower 106 drops toward the second end 130 of the guide body 108 such that the roller shaft ends 118, 118' rest upon and are supported by the respective second stop limits 156, 156' of the grooved members 128, 128' to prevent the cam follower 106 from separating from the guide body 108.

A benefit of the follower assembly 100 is that the cam follower 106 may be retained within the guide body 108 in a predetermined position during shipping and before installation into the pump assembly mount 104. Another benefit is that the guide body 108 restricts the axial reciprocal movement of the cam follower 106 to the Z-axis during normal operations and prevent rotation of the cam follower 106 about the Z-axis and Y-axis. Yet another benefit is that the guide body 108 includes features that properly positions and locate the follower assembly 100 within the mount 104 and to the pump assembly. Still yet another benefit of the follower assembly 100 is that the lower mass reciprocating body enabled by the plastic guide body 108 and lower mass of the cam follower 106. Still yet another benefit of the follower assembly 100 is that the cam follower 106 does not come into contact with a channel defined within the bore, therefore less wear on the cam follower 106. Still yet another benefit of the follower assembly 100 is the reduced noise, vibration, and harshness due to the lower reciprocating mass and reduced metal-to-meal contact.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cam follower assembly comprising:
   a guide body comprising a pair of grooved members,
      wherein each of the grooved members include an interior surface defining an elongated guide groove having a recessed surface, and
      wherein the elongated guide groove of one grooved member is facing and aligned with the elongated guide groove of the other grooved member; and
   a cam follower comprising a roller having a two opposing roller shaft ends,
      wherein the cam follower is disposed between the pair grooved member, and
      wherein one of the roller shaft ends is received in one guide groove and the other of the roller shaft ends is received in the other of the guide groove such that the roller shaft ends are slidable in a reciprocal axial direction within the elongated guide grooves and retained between the recessed surfaces;
   wherein at least one of the elongated guide grooves includes a first stop limit, a second stop limit opposite the first stop limit, and a restrictive projection extending into the elongated guide groove between the first and second stop limits.

2. The cam follower assembly of claim 1, wherein the restrictive projection is sufficiently spaced from the first stop limit to define a retention portion of the elongated guide groove.

3. The cam follower assembly of claim 2, wherein the restrictive projection is sufficiently spaced from the second stop limit to define an operating portion of the elongated guide groove.

4. The cam follower assembly of claim 3, wherein at least one of the first stop limit and second stop limit includes a shape that is complementary to the shape of the roller shaft end.

5. The cam follower assembly of claim 1, wherein the guide body includes a hollow cylindrical portion, and wherein the pair of grooved members extends from an end of the cylindrical portion.

6. The cam follower assembly of claim 5, wherein the hollow cylindrical portion includes an edge surface extending between the pair of grooved members, wherein the edge surface includes a stud.

7. The cam follower assembly of claim 5, wherein the hollow cylinder includes:
   an end having an annular flange defining a radially extending notch, and
   an exterior cylindrical surface defining an axially extending rib aligned with the notch.

8. The cam follower assembly of claim 1, wherein the cam follower includes a follower housing having two opposite facing parallel sides, and wherein the opposite facing parallel sides are slidable against the respective interior surfaces of the grooved members when the roller shaft ends are received within the respective elongated guide grooves.

9. The cam follower assembly of claim 1, wherein the guide body is formed of a plastic material having a reinforcement fiber and the cam follower is formed of a metallic material.

10. A cam follower assembly comprising:
a plastic guide body comprising:
an annular flange,
a chamfered shoulder transitioning from the annular flange to a hollow cylindrical portion, and
a pair of grooved members extending from the hollow cylindrical portion, wherein each of the grooved members includes an interior planar surface defining a guide groove and a recessed surface, wherein one of the guide groove is facing and aligned with the other of the guide grooves; and
a cam follower disposed between the pair of grooved members, where the cam follower comprises:
a follower housing having two opposite facing planar sides and an open face, wherein each of the planar sides defines a roller shaft opening;
a roller partially disposed within the follower housing through the open face, wherein the roller includes a roller shaft having two opposite ends extending out of the follower housing through the shaft openings and received in the respective guide grooves between the recessed surfaces.

11. The cam follower assembly of claim 10, wherein each of the grooved members includes an exterior surface having the same curvature as that of the hollow cylindrical portion.

12. The cam follower assembly of claim 11, wherein the annular flange defines a radially extending notch and a plurality of spaced protrusions, and wherein the hollow cylindrical portion includes an exterior cylindrical surface defining an axially extending rib aligned with the radially extending notch.

13. The cam follower assembly of claim 12, wherein the hollow cylindrical portion includes a stud extending from an edge surface between the pair of grooved members.

14. The cam follower assembly of claim 13, wherein at least one of the elongated grooves include a retention portion and an operating portion separated by a restrictive projection.

15. The cam follower assembly of claim 14, wherein the roller shaft end received in the elongated groove may be urged from the retention portion to the operating portion or from the operating portion to the receiving portion by a predetermined axial force applied against the cam follower.

16. A cam follower assembly comprising:
a plastic guide body comprising a pair of grooved members extending from a hollow cylindrical portion, wherein each of the grooved members includes an interior planar surface defining a guide groove; and
a metallic cam follower comprising two opposing planar surfaces slidably inserted between the interior planar surfaces, and two opposing roller shaft ends extending through the planar surfaces of the metallic cam follower and received in the respective guide grooves of the plastic guide body such that the roller shaft ends are slidable in a reciprocal axial direction within the guide grooves of the plastic guide body;
wherein the plastic guide body further includes an edge surface interconnecting the grooved members, wherein the edge surface includes an extended stud, and wherein the metallic cam follower includes an aperture to receive the stud such that the metallic cam follower is constrained onto the plastic guide body.

17. The cam follower assembly of claim 16, wherein the guide grooves includes a first stop limit, a second stop limit opposite the first stop limit, and a restrictive projection extending into the elongated guide groove between the first and second stop limits.

18. The cam follower assembly of claim 17, wherein the plastic guide body comprises a nylon material and a glass fiber reinforcement.

* * * * *